(12) United States Patent
Enderby (10) Patent No.: US 11,171,797 B2
(45) Date of Patent: Nov. 9, 2021

(54) SYSTEM FOR REDUCING BANDWIDTH USAGE ON A MULTICAST COMPUTER NETWORK

(71) Applicant: Russell Enderby, Atlanta, GA (US)

(72) Inventor: Russell Enderby, Atlanta, GA (US)

( * ) Notice: Subject to any disclaimer, the term of this patent is extended or adjusted under 35 U.S.C. 154(b) by 68 days.

(21) Appl. No.: 16/689,398

(22) Filed: Nov. 20, 2019

(65) Prior Publication Data

US 2021/0152384 A1 May 20, 2021

(51) Int. Cl.
*H04L 12/18* (2006.01)
*H04N 21/6405* (2011.01)
*H04L 12/58* (2006.01)
*H04L 12/64* (2006.01)

(52) U.S. Cl.
CPC ........ *H04L 12/1868* (2013.01); *H04L 12/185* (2013.01); *H04L 51/26* (2013.01); *H04N 21/6405* (2013.01); *H04L 2012/6456* (2013.01)

(58) Field of Classification Search
CPC ... H04L 12/1868; H04L 12/185; H04L 51/26; H04N 21/6405
USPC .......................................... 370/252, 329–330
See application file for complete search history.

(56) References Cited

U.S. PATENT DOCUMENTS

| | | | | |
|---|---|---|---|---|
| 6,633,765 B1* | 10/2003 | Maggenti | ................. | H04W 4/08 455/503 |
| 9,510,166 B1* | 11/2016 | Allen | .................... | H04W 76/45 |
| 2010/0248742 A1* | 9/2010 | Song | .................... | H04L 12/1881 455/456.1 |
| 2013/0007231 A1* | 1/2013 | Forssell | ................ | H04L 41/082 709/221 |
| 2014/0126452 A1* | 5/2014 | Agulnik | .............. | H04L 65/1093 370/312 |
| 2014/0185513 A1* | 7/2014 | Ahmadi | .................. | H04W 4/08 370/312 |
| 2015/0131510 A1* | 5/2015 | Gilbert | .................... | H04W 4/06 370/312 |
| 2016/0302048 A1* | 10/2016 | Suzuki | .................... | H04W 4/10 |

* cited by examiner

*Primary Examiner* — Candal Elpenord
(74) *Attorney, Agent, or Firm* — RC Trademark Company (57) ABSTRACT

According to some embodiments, a system for reducing bandwidth usage is disclosed. The system comprises a computer server that receives a request to initiate a multicast communication over a computer network and a computer readable medium comprising instructions that perform a method when executed by the centralized computer server. The method comprises initiating a multicast communication and assigning a unique identifier to the multicast communication. A set of messages associated with the unique identifier is received. If it is determined that a number of messages is greater than a pre-determined number of messages, determining a location of each of the users and grouping the users into a first group and into a second group where the first group are all located within a pre-defined radius based on a first determined location and the second group are all located within a pre-defined radius based on a second determined location.

15 Claims, 7 Drawing Sheets

300

In response to receiving the request to initiate a multicast communication, assign a unique identifier to be associated with the multicast communication  310

Receive a set of messages associated with the unique identifier from a plurality of users  320

Determine that the number of messages is greater than a pre-determined number of messages  330

Determine a location of each of the plurality of users  340

Group the plurality of users into a first group and into a second group where the first group are all located within a pre-defined radius based on a first determined location and the second group are all located within a pre-defined radius based on a second determined location  350

Transmit a first multicast communication to the first group and not the second group  360

Transmit a second multicast communication to the second group and not the first group.  370

SYSTEM FOR REDUCING BANDWIDTH USAGE ON A MULTICAST COMPUTER NETWORK

BACKGROUND

Figure 1:
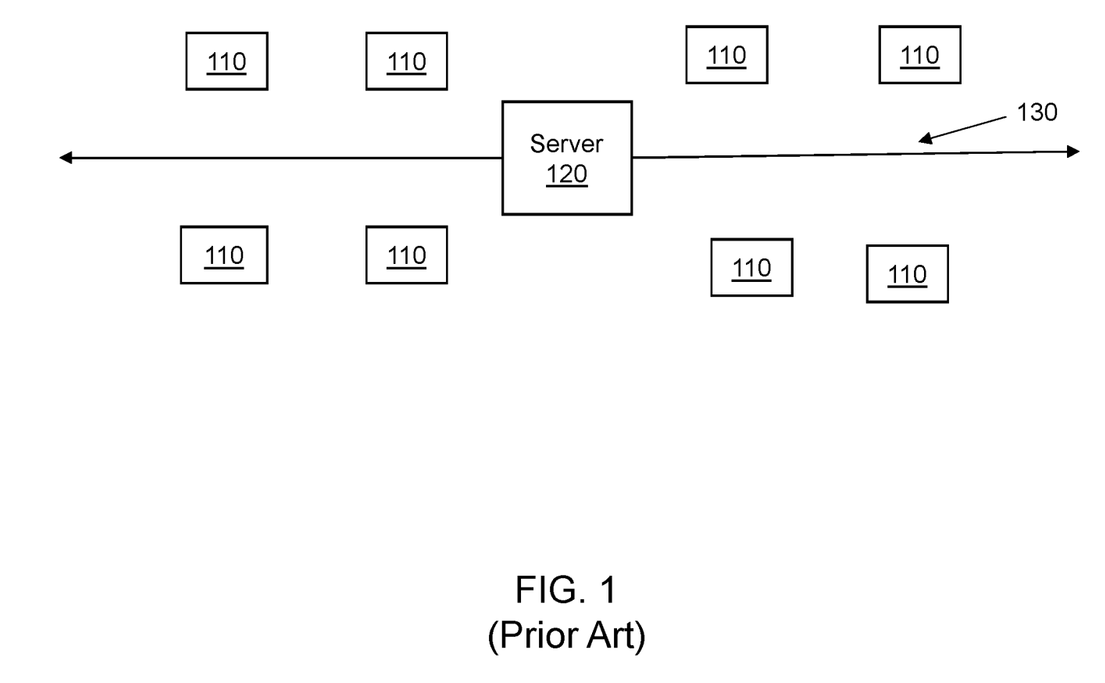
FIG. 1 illustrates a network in accordance with some embodiments.

In computer networking, multicast communication may be viewed as a group communication where data transmission is addressed to a group of destination computers simultaneously. Multicast communication can be a one-to-many or a many-to-many distribution of messages. When multicast communications occur within large groups, it is easy (i) for a network to become overwhelmed and overloaded causing messages to be backed off and/or (ii) for the network to fail. For example, and now referring to FIG. 1, a centralized server 120 may receive a message from one of a plurality of users 110 on a network 130. The message may then be re-transmitted to the remaining users 110. As more and more users 110 transmit messages over network 130, the network may become bogged down, sluggish or may simply fail. Moreover, some of the users 110 may not be interested in the messages that are being transmitted and these messages may be unnecessary and may simply clog up the network. Some conventional methods to reduce network traffic include automatically creating copies of messages in other network elements, such as routers and switches on segments that currently include destination computers. However, this creates extra work for network devices. It would therefore be desirable to provide a system to reduce bandwidth usage for multicast communication.

SUMMARY

Some embodiments described herein relate to a system for reducing bandwidth usage. The system comprises a computer server that receives a request to initiate a multicast communication over a computer network and a computer readable medium comprising instructions that perform a method when executed by the centralized computer server. The method comprises initiating a multicast communication and assigning a unique identifier to the multicast communication. A set of messages associated with the unique identifier is received. If it is determined that a number of messages is greater than a pre-determined number of messages, determining a location of each of the users and grouping the users into a first group and into a second group where the first group are all located within a pre-defined radius based on a first determined location and the second group are all located within a pre-defined radius based on a second determined location.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

Figure 2:
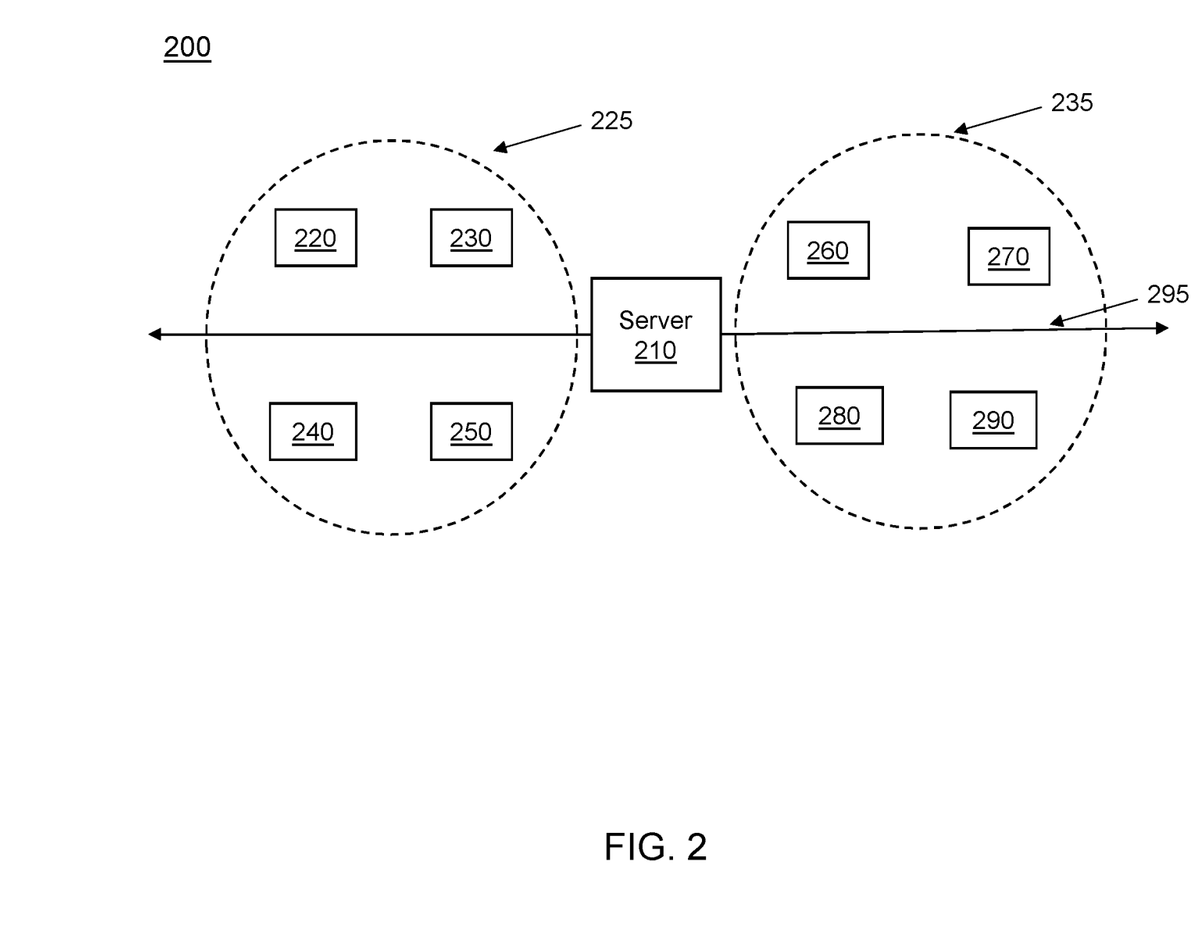
FIG. 2 illustrates a network in accordance with some embodiments.

The present embodiments relate to a system and method for reducing bandwidth usage during multicast communication. Now referring to FIG. 2, an embodiment of a system 200 is illustrated. As illustrated in FIG. 2, a multicast communication server 210 may communicate to one or more devices 220/230/240/250/260/270/280/290 that are communicably coupled to a network 295. The network 295 may comprise any wired or wireless network that may be used for communication purposes between electronic devices. For example, the network 295 may comprise, but is not limited to, a wired and/or wireless network, LAN, MAN, or WAN. For example, the network 295 may comprise a mesh network, a cellular network or an IEEE 802.11 based network (e.g., a Wi-Fi network).

For purposes of illustration, the one or more devices 220/230/240/250/260/270/280/290 may comprise a cellular phone, a laptop computer, a desktop computer or a tablet computer. Also, for purposes of illustration, the multicast communication server 210 may function as a master computer and may comprise, but is not limited to, a server, a hub, a switch, a controller or a router. In some embodiments, the multicast communication server 210 may comprise a group of distributed devices (e.g., servers, hubs, switches, controllers or routers or a combination thereof) that function as a single multicast communication server 210.

The present embodiments relate to a case where messages sent between all of the one or more devices 220/230/240/250/260/270/280/290 may not be necessary or the users associated with the one or more devices 220/230/240/250/260/270/280/290 may not be interested in receiving every message being transmitted and the messages that are not necessary may be unnecessarily using up available bandwidth associated with the network 295.

In one embodiment, a physical location of the one or more devices 220/230/240/250/260/270/280/290 may be determined. This determination may be based on an internet protocol ("IP") address of the devices, a global positioning system/global positioning satellite system ("GPS") location associated with the device, a configuration file that indicates a location of the device, and/or a registration of the device on a platform where a location is manually entered. As illustrated in FIG. 2, devices 220/230/240/250 may be located within a predetermined radius 225 of each other and devices 260/270/280/290 may also be located within a predetermined radius 235 of each other. In some embodiments, radius 225 and radius 235 may be a same distance but these radiuses may be enlarged or may shrink to save on system resources as will be described below. As shown in FIG. 2, communication between devices may be limited to the predetermined radius. For example, messages sent to, and from, devices 220/230/240/250 may only be received by devices 220/230/240/250. Likewise, messages sent to, and from, devices 260/270/280/290 may only be received by devices 260/270/280/290. Communication between the devices may be based on the method described with respect to FIG. 3.

Figure 3:
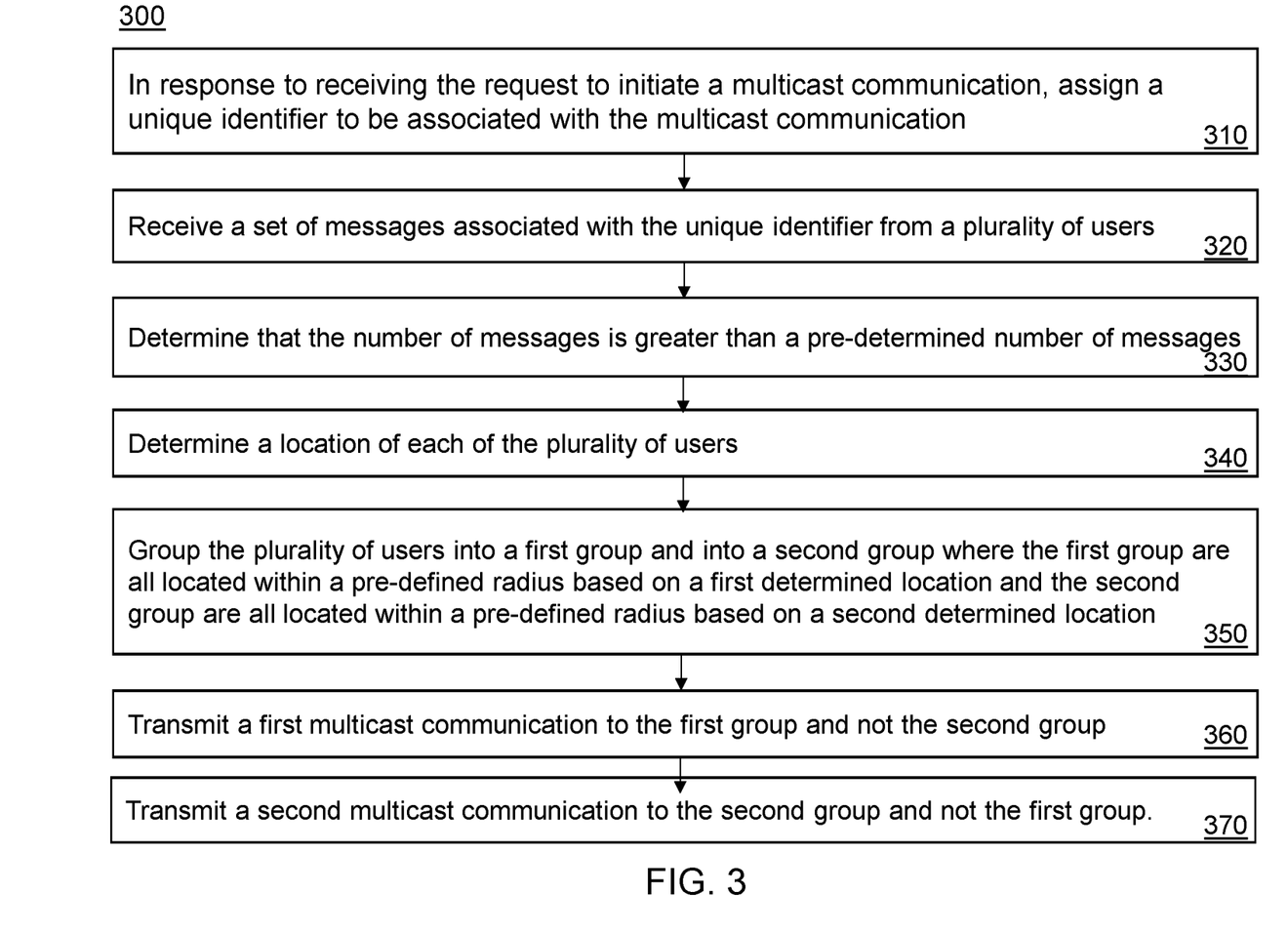
FIG. 3 illustrates a method according to some embodiments.

Now referring to FIG. 3, a method 300 that might be performed by an electronic device, such as the multicast communication server 210, described with respect to FIG. 2, is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 300 may relate to adaptively reducing bandwidth and processor usage on a multicast computer network. Now referring to 310, where in response to receiving a request to initiate a multicast communication, a unique identifier may be assigned to, or associated with, the multicast communication.

For purposes of illustrating features of the present embodiments, some simple examples will now be introduced and referenced throughout the disclosure. Those skilled in the art will recognize that these examples are illustrative and are not limiting and are provided purely for explanatory purposes.

In some embodiments, a real-time chat room may be dynamically created based on a user reading a new article, or a story, and then selecting a chat button that either dynamically creates the chat room or joins the user in an already created chat room. If this news article/story is posted on a national news website (e.g., CNN, FOX, etc.) then users all over the country may start communicating in real-time in the dynamically created chat room. A nationwide surge of users joining a chat room can easily overload a network having thousands and thousands of users from all over the nation, or world, communicating at the same time. Moreover, some users may be communicating in different languages which other users may not be interested in seeing or some discussions may be based on regional differences. Therefore, the present embodiments may limit communication in the real-time chat room based on an approximate physical location of each particular user. When a real-time chat room is initiated, a unique identifier is assigned to the newly initiated chat room and all communication associated with this chat room will utilize the assigned unique identifier. For example, the chat room may be initially assigned chat room C100.

Next, at 320, a set of messages associated with the unique identifier is received from a plurality of users. Thus, in the present example, the receive set of messages are associated with the unique identifier and these messages will be sent to users who are receiving multicast messages associated with the unique identifier. For example, the users who are connected to the real-time chat room will receive messages associated with unique identifier C100.

At 330, it is determined that the number of messages to be sent based on the unique identifier is greater than a predetermined number of messages. To prevent a network from overloading or bogging down, the system may determine that a number of messages to be multicast is greater than the network can handle (e.g., a predetermined number of messages). Continuing with the above-example, if one thousand people, for example, send a message in the chatroom, the multicast communication server may determine that there are too many messages being sent associated with multicast identification C100.

In response to determining that there are too many messages being sent, the multicast communication server 210 may determine a physical location of each of the plurality of users sending messages at 340. This determination may be based on an IP address of each of the users sending the messages and/or a GPS location of each user which may be sent as part of a message (e.g., users connected via cellular communication).

Continuing with the above example, a location of each device transmitting or receiving messages associated with the multicast identification may be determined. For example, and referring back to FIG. 2, a location of each device 220/230/240/250/260/270/280/290 may be determined based on their associated IP addresses, GPS locations associated with each device, a configuration file that indicates a location of each device, and/or a manual registration of each device's location. In other words, each device that is transmitting or receiving messages associated with multicast identification C100 may have its location determined or may respond to a request for its location (e.g., a confirmation message associated with receiving a message marked with the unique identifier). In some embodiments, any device that indicates that it wishes to receive multicast messages (e.g., a device associated with a user that has signed into a chat room) may transmit its location, IP address and/or GPS location to a multicast server.

Referring back to FIG. 3, the plurality of users may be grouped into a first group and into a second group at 350 where the first group are all located within a pre-defined radius based on a first determined location and the second group are all located within a pre-defined radius based on a second determined location.

Continuing with the above example, and again referring back to FIG. 2, the multicast communication server 210 may determine a first location, a second location and a predefined radius so that the multicast communication server may group the users into two or more groups. For example, users in group 225 may be within a predetermined radius of, for example, 100 miles. Likewise, users in group 235 may be within the predetermined radius of, for example, 100 miles. Each group may be considered a sub-group and may be assigned its own unique identification. For example, group 225 may be assigned unique identifier C100-1 and group 235 may be assigned unique identifier C100-2. Thereafter, messages may be limited to particular sub-groups within multicast identification C100.

In some embodiments, the predetermined radius may be referred to as a geofence. The radius or geofence may be based on maximizing groups within geographical areas to minimize network bandwidth and processor usage. For example, the multicast communication server may determine a central location associated with a plurality of devices to base the predetermined radius for the purpose of maximize a size the sub groups in view of processor usage and network bandwidth. Once the sub-groups are created, communication may be contained within a particular geofence. Next, at 360 a first multicast communication may be transmitted to the first group and not the second group and, at 370, a second multicast communication may be transmitted to the second group and not the first group.

Continuing with the above example, communication within sub-group C100-1 may be limited to only members of that sub-group and communication within sub-group C100-2 may be limited to only members of subgroup C100-2. Multicast communication, such as that used for dynamically created chat rooms, may be dynamic in nature and users/devices may continually join or leave the groups/sub-groups. As more and more users join a chat room, more and more messages may be multicast and as people leave the chat rooms, fewer groups may be needed. For example, when a new story is printed, the number of users in a dynamically created chatroom may grow quickly so the multicast communication server must be able to quickly react to the growing chat environment. Likewise, as a story become old news, fewer and fewer people will enter the chat room and the system may have to dynamically scale down the chat rooms to save on processor and memory overhead. Therefore, the multicast communication server 210 may dynamically consolidate sub-groups, add new users/devices to existing sub-groups or add new sub-groups based on the number of people joining or leaving. These are illustrated with respect to FIG. 4, FIG. 5 and FIG. 6.

Figure 4:
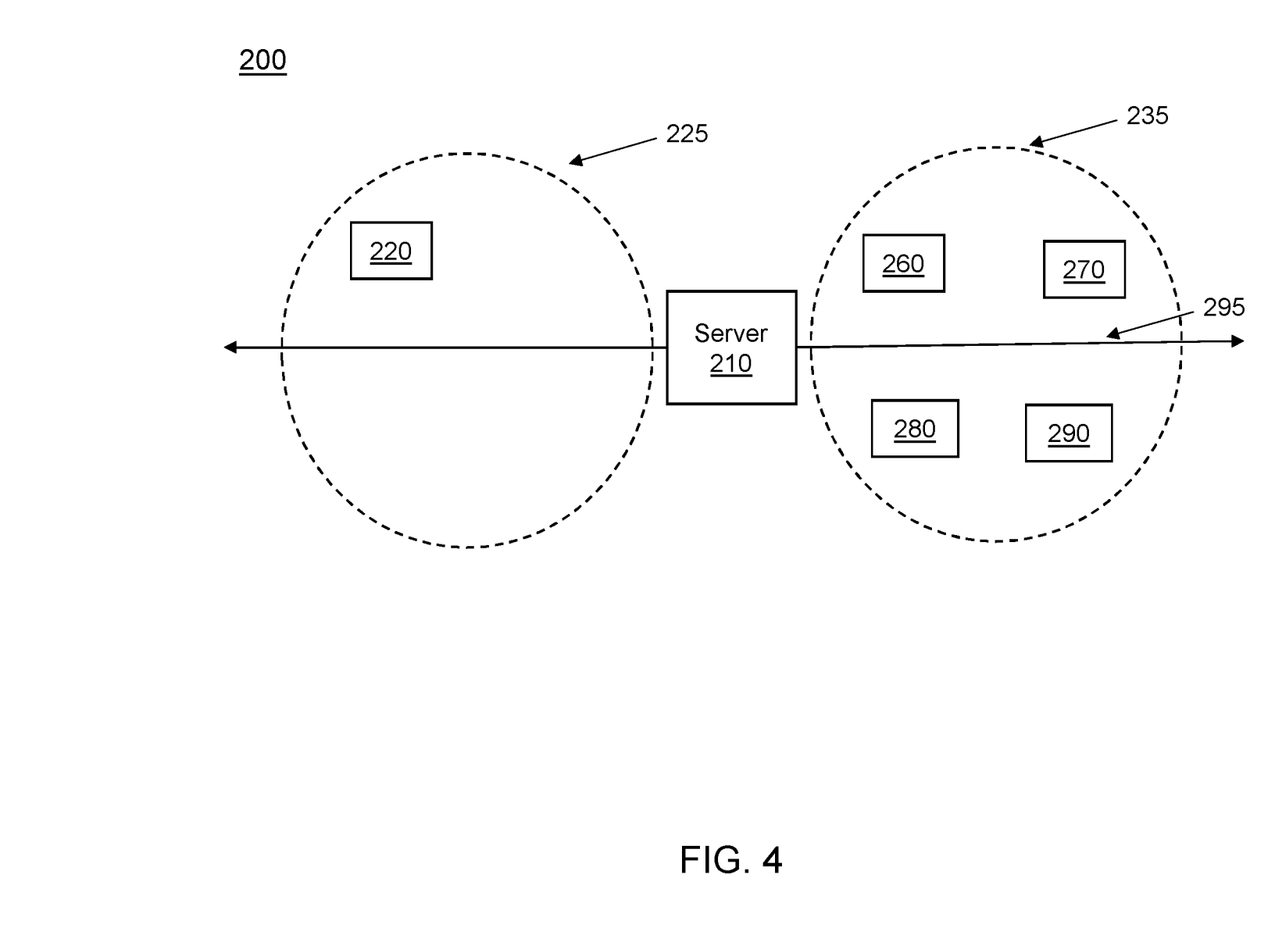
FIG. 4 illustrates a network in accordance with some embodiments.
Figure 5:
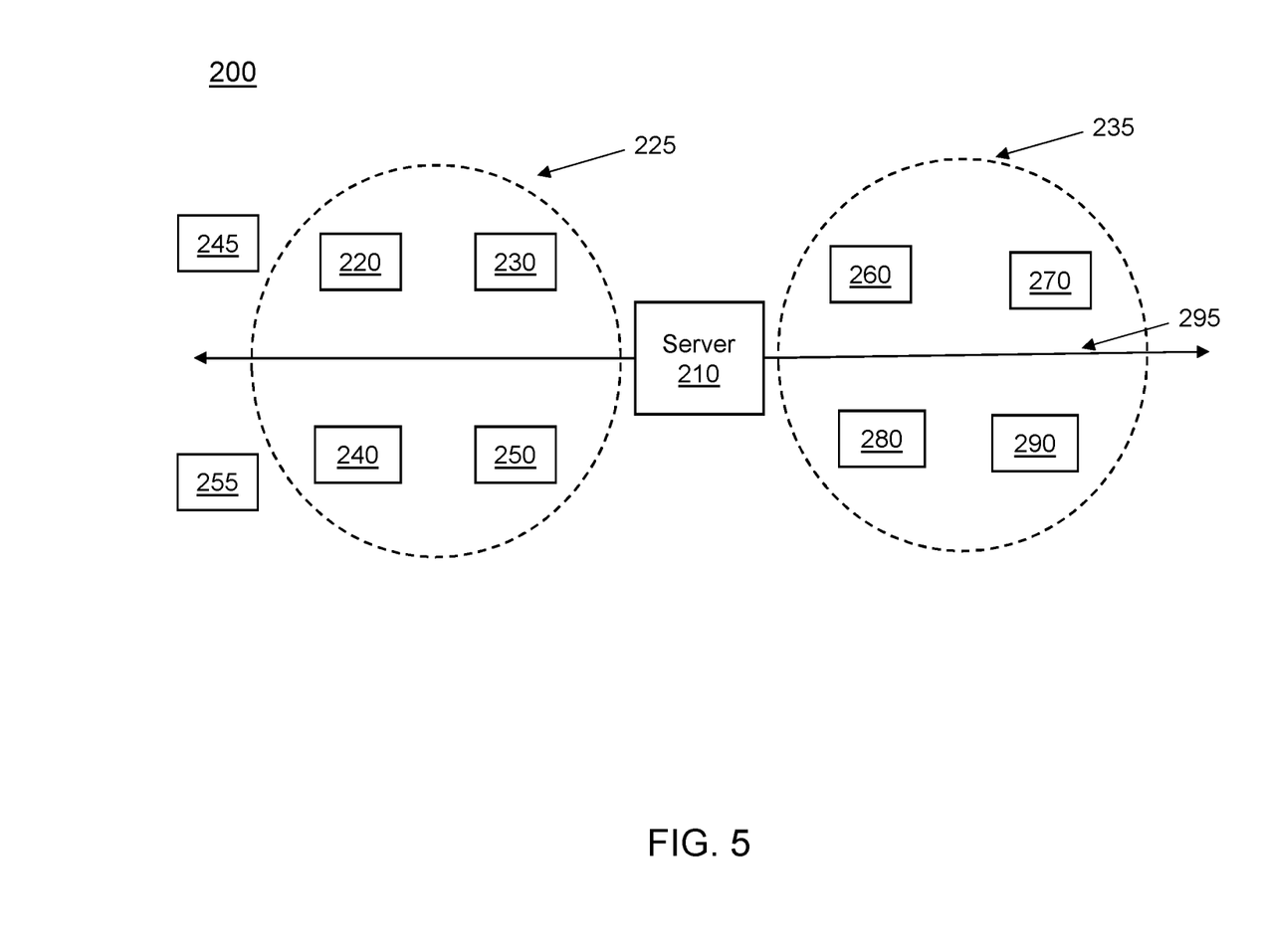
FIG. 5 illustrates a network in accordance with some embodiments.

Referring now to FIG. 4 and FIG. 5, embodiments of system 200 are show to illustrate how the system responds to devices joining or leaving multicast communication groups. FIG. 4 illustrates devices leaving multicast groups and FIG. 5 illustrates devices joining multicast groups. In a case that a number of devices disconnect from a network, or a service that a network is providing messages to (e.g., a chat room), the multicast communication server 210 may reorganize the groups so that processor resources may be saved. Since a group has less than a predetermined number of devices, the multicast communication server 210 may reorganize the groups so that the multicast communication server 210 does not have to manage multiple groups thus saving on resources (e.g., processor resources, memory resources, network resources). For example, and as shown in FIG. 4, devices 230/240/250 have disconnected from network 295 or may have left a chat room. Since device 220 is the sole remaining device, the multicast communication server 210 may regroup the devices such that device 220 is added back to the group comprising devices 260/270/280/290. This may be accomplished by assigning the same group identification to device 220 as devices 260/270/280/290. This way, the multicast communication server 210 may only have to manage a single group which saves on processor and memory usage.

Referring now to FIG. 5, in a case that new devices (e.g., device 245 and device 255) are connected to the network 295, a determination of the physical distance of device 245 and device 255 from other groups may be determined. Once locations of device 245 and device 255 are determined, the multicast communication server 210 may then determine if device 245 and device 255 should be added to an existing group (e.g., the new devices are already within a predetermined radius of an existing group or if they can be joined with an existing group by extending the predetermined radius within a predetermined percentage) or if the new devices should be part of a new group.

For example, the multicast communication server 210 may first predetermine if device 245 and device 255 are within a predetermined radius of an existing group. If the device 245 and device 255 are already within a predetermined radius of an existing group, device 245 and device 255 may be added to the existing group. Next, the multicast communication server 210 may determine if a location of device 245 and device 255 is outside the radius of an existing group but within an acceptable distance (e.g., within 10 percent of the radius). For example, if the predetermined radius of an existing group is 100 miles, and adding in device 245 and 255 would increase the radius to 110 miles, the multicast communication server 210 may determine that it would use less bandwidth and processor power to increase the predetermined radius to include the new devices than creating a new group which may require more overhead.

Figure 6:
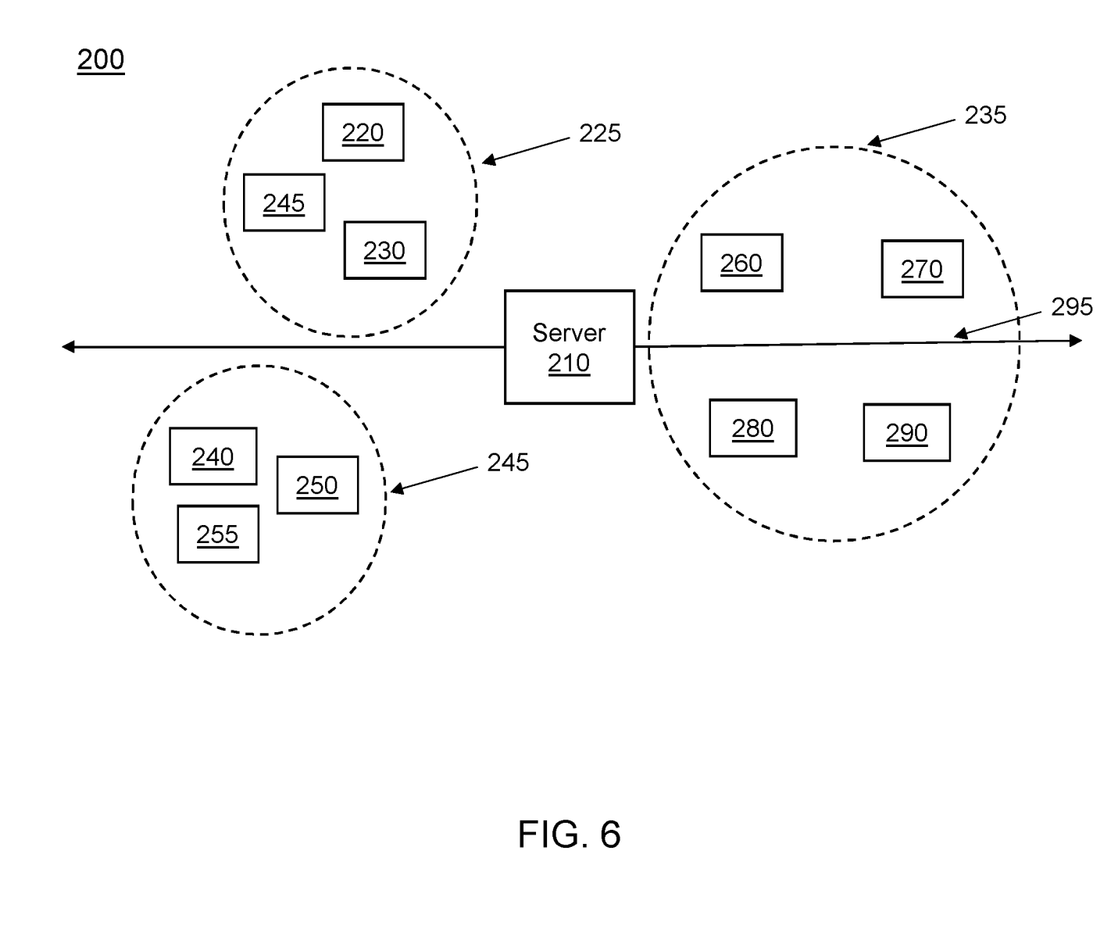
FIG. 6 illustrates a network in accordance with some embodiments.

FIG. 6, illustrates an example where the multicast communication server 210 determines that adding in device 245 and 255 to an existing group would increase the predetermined radius greater than an acceptable percentage based on management of the network and allocation of resources. Therefore, the multicast communication server 210 may break up sub-group 225 into two groups (e.g., sub group 225 and sub group 245) with unique identifications. For example, the multicast communication server 210 may create three groups including C100-1, C100-2-1 and C100-2-2.

In some embodiments, the newly created groups C100-2-1 and C100-2-2 may have a predetermined radius that is less than the initial predetermined radius. For example, in some embodiments, when a sub-group becomes too dense (e.g., too many people are located within a same predetermined radius), a sub-group may be split into multiple sub-groups based on a sub-chat density metric. For example, if it creates less overhead or bandwidth to service two smaller groups than one large group, the system may divide a sub-group into sub-sub-groups. In some embodiments, creating new sub-groups may also be based on a determination that a particular sub-group (e.g., by monitoring key words) has changed topics or conversations and thus a newly created sub-group may be for the purpose of narrowing the sub-group communication to a more specific point/topic which may limit an audience and thus may limit bandwidth usage.

In some embodiments, a sub-group may be split into multiple sub-groups based on an amount of traffic generated by a particular group. For example, a sub-group that is determined to be a busiest sub-group may be divided into multiple smaller sub-groups, associated with smaller radiuses. This subdividing of groups may further reduce network congestion by limiting high bandwidth use to only particular geographic locations. Also, in this embodiment, other users may be able to see the busiest sub-groups to allow users to find the hottest media content being discussed around the world.

In some embodiments, a priority of messages may be determined and messages that are displayed may be based on determining a "speaking weight" of a device that may increase over time as that device provides a greater number of messages in a chat room. In some embodiments, the speaking weight may be based on a user reporting/voting system where other users determine a user with a greatest speaking weight. The voting system may also allow users to report offensive users by indicating a zero or negative weight for offensive users. In some embodiments, to create a sub-group, a device may post a specific status message (e.g., a desired specific point/topic), and the status messages may be displayed in a local activity area to all users in the sub-group. In this embodiment, a new sub-group may be dynamically created based on a user selecting a displayed status message to initiate a sub-group (e.g. chat room).

In some embodiments, the communication of messages within a particular sub-group may be throttled. For example, a sub-group may comprise a configurable rate of throttling that may be implemented or dynamically changed by the multicast communication server 210 which may increase, or decrease, a speed at which messages are multicast within a particular group. This may allow the multicast communication server 210 to manage processor usage and network bandwidth during times of increased message traffic. In some embodiments, external multiplexed networks may be able to connect to various groups of users. For example, a set or subset of users may be indexed by an external mechanism. In this case, an external company may use a pre-made API to tie the multicast network into an external media source.

In some embodiments, users may be able to create their own custom groups and/or re-group themselves. For example, in a sub-group, users may be able to create their own sub-group rooms to assist in narrowing down the topic of discussion in addition to the automatic grouping based on system determined locations of the users. To implement a custom sub-group room, one or more users may send a request to the multicast communication sever 210 to implement the sub-group. In response to receiving the request, the multicast communication server 210 may create a unique multicast identification for the custom sub-group.

Figure 7:
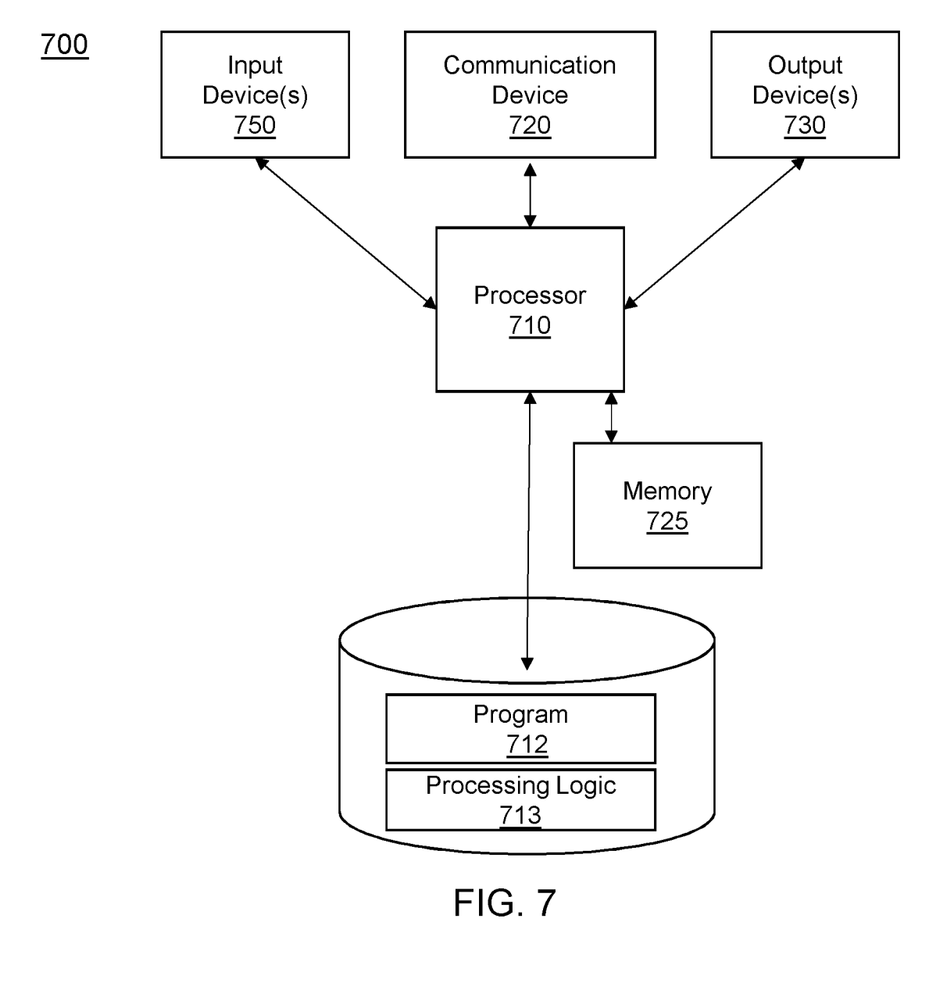
FIG. 7 illustrates a multicast communication server in accordance with some embodiments.

Note the embodiments described herein may be implemented using any number of different hardware configurations. For example, FIG. 7 illustrates one embodiment of a multicast communication server 700 that may be, for example, associated with the system 200 of FIG. 2. The multicast communication server 700 may provide a technical and commercial advantage by being able to implement create a geofence to limit multicast network communication.

The multicast communication server 700 may comprise a processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The electronic device 700 further includes an input device 740 (e.g., a mouse and/or keyboard to enter information about failsafe actions or system time intervals) and an output device 730 (e.g., to output and display the data and/or alerts).

The processor 710 also communicates with a memory 725 and storage device 730 that stores data 713. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or processing logic 713 for controlling the processor 710. The processor 710 performs instructions of the programs 712, 713, and thereby operates in accordance with any of the embodiments described herein. For example, the processor 710 may receive data from a timer integral to the processor 710 an may institute a failsafe action via the instructions of the programs 712 and processing logic 713.

The programs 712, 713 may be stored in a compiled, compressed, uncompiled and/or encrypted format or a combination. The programs 712, 713 may furthermore include other program elements, such as an operating system, a database management system, and/or device drivers used by the processor 710 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A system for adaptively reducing bandwidth usage on a multicast computer network, the system comprising:
a centralized computer server that receives a request to initiate a multicast communication over a computer network; and
a non-transitory computer readable medium, comprising computer-executable instructions that perform a method when executed by the centralized computer server, the method comprising:
in response to receiving the request to initiate a multicast communication, assigning a unique identifier to be associated with the multicast communication;

receiving a set of messages associated with the unique identifier from a plurality of users;

determining that the number of messages is greater than a pre-determined number of messages;

determining a location of each of the plurality of users;

grouping the plurality of users into a first group and into a second group where the first group are all located within a pre-defined radius based on a first determined location and the second group are all located within a pre-defined radius based on a second determined location;

transmitting a first multicast communication to the first group and not the second group;

transmitting a second multicast communication to the second group and not the first group;

receiving a second set of messages associated with the unique identifier from a second plurality of users associated with the second group;

determining that a number of users associated with the second group is greater than a pre-determined number of users; and regrouping the second group, including the second plurality of users, into a third group and a fourth group where the third group are all located within a second pre-defined radius based on a third determined location and the fourth group are all located within the second pre-defined radius based on a fourth determined location;

transmitting a third multicast communication to the first group and not the third group or the fourth group; and transmitting a second multicast communication to the third group and not the first group or the fourth group.

2. The system of claim 1, wherein the computer-executable instructions further comprise:

determining that a number of users associated with the second group is below a pre-determined minimum number of users; and regrouping the second group with the first group.

3. The system of claim 1, wherein the computer-executable instructions further comprise:

receiving a second set of messages associated with the unique identifier from a second plurality of users;

determining that a number of users associated with the second group is less than a maximum number of users; and determining a new pre-defined radius based on the users associated with the second; and regrouping the second group based on the new pre-defined radius.

4. The system of claim 1, wherein transmitting a first multicast communication to the first group comprising transmitting a message based on a priority weight of a sender.

5. The system of claim 1, wherein transmitting of the first or second multicast communications comprises a multicast transmission from one or a cascading set of multiplexing servers.

6. A non-transitory computer readable medium, comprising computer-executable instructions that perform a method when executed by a processor, the method comprising:

in response to receiving the request to initiate a multicast communication, assigning, via a processor, a unique identifier to be associated with the multicast communication;

receiving a set of messages associated with the unique identifier from a plurality of users;

determining that the number of messages is greater than a pre-determined number of messages;

determining a location of each of the plurality of users;

grouping, via the processor, the plurality of users into a first group and into a second group where the first group are all located within a pre-defined radius based on a first determined location and the second group are all located within a pre-defined radius based on a second determined location;

transmitting a first multicast communication to the first group and not the second group;

transmitting a second multicast communication to the second group and not the first group;

receiving a second set of messages associated with the unique identifier from a second plurality of users associated with the second group;

determining that a number of users associated with the second group is greater than a pre-determined number of users; and regrouping the second group, including the second plurality of users, into a third group and a fourth group where the third group are all located within a second pre-defined radius based on a third determined location and the fourth group are all located within the second pre-defined radius based on a fourth determined location;

transmitting a third multicast communication to the first group and not the third group or the fourth group; and transmitting a second multicast communication to the third group and not the first group or the fourth group.

7. The medium of claim 6, wherein the computer-executable instructions further comprise:

determining that a number of users associated with the second group is below a pre-determined minimum number of users; and regrouping the second group with the first group.

8. The medium of claim 6, wherein the computer-executable instructions further comprise:

receiving a second set of messages associated with the unique identifier from a second plurality of users;

determining that a number of users associated with the second group is less than a maximum number of users; and determining a new pre-defined radius based on the users associated with the second; and regrouping the second group based on the new pre-defined radius.

9. The medium of claim 6, wherein transmitting a first multicast communication to the first group comprising transmitting a message based on a priority weight of a sender.

10. The medium of claim 6, wherein transmitting of the first or second multicast communications comprises a multicast transmission from one or a cascading set of multiplexing servers.

11. A method for adaptively reducing bandwidth usage on a multicast computer network, the method comprising:

in response to receiving the request to initiate a multicast communication, assigning a unique identifier to be associated with the multicast communication;

receiving a set of messages associated with the unique identifier from a plurality of users;

determining that the number of messages is greater than a pre-determined number of messages;

determining a location of each of the plurality of users;

grouping, via a processor, the plurality of users into a first group and into a second group where the first group are all located within a pre-defined radius based on a first determined location and the second group are all located within a pre-defined radius based on a second determined location;
transmitting a first multicast communication to the first group and not the second group;
transmitting a second multicast communication to the second group and not the first group;
receiving a second set of messages associated with the unique identifier from a second plurality of users associated with the second group;
determining that a number of users associated with the second group is greater than a pre-determined number of users; and
regrouping the second group, including the second plurality of users, into a third group and a fourth group where the third group are all located within a second pre-defined radius based on a third determined location and the fourth group are all located within the second pre-defined radius based on a fourth determined location;
transmitting a third multicast communication to the first group and not the third group or the fourth group; and
transmitting a second multicast communication to the third group and not the first group or the fourth group.

12. The method of claim 11, wherein the computer-executable instructions further comprise:
determining that a number of users associated with the second group is below a pre-determined minimum number of users; and
regrouping the second group with the first group.

13. The method of claim 11, wherein the computer-executable instructions further comprise:
receiving a second set of messages associated with the unique identifier from a second plurality of users;
determining that a number of users associated with the second group is less than a maximum number of users; and
determining a new pre-defined radius based on the users associated with the second; and
regrouping the second group based on the new pre-defined radius.

14. The method of claim 11, wherein the request to initiate a multicast communication is based on a user displaying a status message in a local activity area to a plurality of users.

15. The method of claim 11, further comprising regrouping the second group, including the second plurality of users, into a third group and a fourth group based on a determination that the second group has becomes too dense.

* * * * *